United States Patent
Hirsch

(10) Patent No.: US 6,389,282 B1
(45) Date of Patent: May 14, 2002

(54) OPERATION AND MAINTENANCE SYSTEM FOR A MOBILE COMMUNICATIONS NETWORK

(75) Inventor: Lucian Hirsch, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/477,133

(22) Filed: Jan. 3, 2000

Related U.S. Application Data

(63) Continuation of application No. PCT/DE98/01549, filed on Jun. 5, 1998.

(30) Foreign Application Priority Data

Jul. 2, 1997 (DE) .......................................... 197 28 193

(51) Int. Cl.$^7$ .............................. H04Q 7/20; H04M 1/66
(52) U.S. Cl. ........................ 455/423; 455/411; 455/507; 345/853; 713/200
(58) Field of Search ................................ 455/423, 424, 455/411, 410, 507, 67.1, 433; 380/247, 248, 249, 270, 271; 713/191, 168, 187, 182, 183, 200; 711/163, 173; 345/853

(56) References Cited

U.S. PATENT DOCUMENTS

| | | | |
|---|---|---|---|
| 5,402,491 A | | 3/1995 | Locascio et al. |
| 5,414,844 A | * | 5/1995 | Wang .......................... 713/200 |
| 5,801,707 A | * | 9/1998 | Rolnik et al. ................ 345/429 |
| H1897 H | * | 10/2000 | Fletcher et al. ............. 455/433 |

FOREIGN PATENT DOCUMENTS

| | | |
|---|---|---|
| DE | 42 23 995 A1 | 2/1994 |
| DE | 41 18 356 C2 | 8/1994 |
| DE | 196 27 215 A1 | 1/1997 |
| EP | 0 442 839 A2 | 8/1991 |
| EP | 0 737 907 A2 | 10/1996 |
| EP | 0 528 442 B1 | 9/1997 |

OTHER PUBLICATIONS

International Patent Application WO 96/30823 (Ayoub et al.), dated Oct. 3, 1996.

E.H. Schmid et al.: "GSM Operation and Maintenance", Electrical Communication, $2^{nd}$ Quarter, Paris, France, pp. 164–171.

"Sign On and Be Safe" IBM's Network Security Program (NetSP), Data Communications, Jan. 24, 1995, No. 1, New York, USA, pp. 122, 124.

* cited by examiner

*Primary Examiner*—Tracy Legree
(74) *Attorney, Agent, or Firm*—Herbert L. Lerner; Laurence A. Greenberg; Werner H. Stemer

(57) ABSTRACT

An operation and maintenance system for a mobile communications network allows to execute a network configuration centrally from a maintenance device of an operation and maintenance center and allows to execute a network configuration peripherally with the aid of a local maintenance terminal which can be connected to a network device of a base station subsystem of the mobile communications network. An access table contains, for each operator authorized for access to the operation and maintenance system, a name entry, a specific operator password to be used by the operator for access via a local maintenance terminal, and information on the extent of the operator's access authorization. The access table is stored in the operation and maintenance center. A controller in the operation and maintenance center administers the access table and initiates a nonvolatile storing of in each case at least that part of the access table in network devices of the base station subsystem which is required for an access performed with the aid of an LMT maintenance device and performed via these network devices.

22 Claims, 4 Drawing Sheets

OPERATION AND MAINTENANCE SYSTEM FOR A MOBILE COMMUNICATIONS NETWORK

CROSS-REFERENCE TO RELATED APPLICATION

This application is a continuation of copending International Application PCT/DE98/01549, filed Jun. 5, 1998, which designated the United States.

BACKGROUND OF THE INVENTION

Field of the Invention

The invention relates to an operation and maintenance system for a mobile communications network.

A mobile communications network is a hierarchically structured system of various network elements, in which the lowest hierarchical level is formed by the mobile telephones, also called mobile stations (MS). These mobile stations communicate with radio base stations forming the next hierarchical level, which are also called base stations or base transceiver station equipment (BTSE), via a so-called Um interface or radio interface.

Due to the relatively short radio range of such base stations, a mobile communications network of a normal size contains a large number of base stations. These base stations are combined in regions for leading and controlling the data traffic between them. The higher-level network elements provided for this purpose are called base station controller (BSC). The base stations communicate with the base station controllers via a so-called Abis interface. If necessary, a transcoder and rate adapter unit (TRAU) can be allocated to a base station controller for optimizing the data communication. The base stations, the base station controllers and the transcoder and rate adapter units form a base station subsystem (BSS) of the mobile communications network. In this configuration, base stations, base station controllers and transcoder and rate adapter units are network devices of the base station subsystem.

The base station controllers communicate via so-called A interfaces with one or a few mobile switching centers (MSC), which are also used as gateways to other telephone networks, among other things. Together with a few databases, the mobile switching centers form the network switching subsystem (NSS).

Apart from the network element hierarchies described above, there is an operation and maintenance subsystem (OMS). The operation and maintenance subsystem is used for configuring and monitoring all network elements. For this purpose, monitoring measures and configuration measures are in most cases remotely controlled from operation and maintenance centers (OMC), which are usually located in the area of mobile switching centers.

One of the tasks of the operation and maintenance subsystem is the execution of a configuration management (CM), which represents one of five management function areas which identify the telecommunication management network principles. The configuration management defines a number of services which enable the structure, and thus the characteristics of a communications network to be changed by the operator. These services are always related to entities or instances of managed objects which together form the network-specific management information base (MIB).

In principle, the configuration of a mobile communications network can be managed from two sides, namely either centrally from a workstation of an operation and maintenance center, also called operation and maintenance terminal (OMT), or in the area of the network peripherals with the aid of a maintenance device which is also called local maintenance terminal (LMT) which can be connected to any network devices of the base station subsystem, i.e. to a base station, a base station controller or a transcoder and rate adapter unit via a so-called T interface. In this configuration, a number of LMT maintenance devices can be simultaneously connected to various network devices. For the purpose of changing function-related entities of managed objects, LMT maintenance devices connected to network devices are operated in two different modes. If an LMT maintenance device is directly connected to a base station, base station controller or transcoder and rate adapter unit, the LMT maintenance device is operating in the normal mode in which it directly acts on the corresponding network device. If the LMT maintenance device is connected to a base station or to a transcoder and rate adapter unit, it is operated in the base station controller remote control mode and acts on the associated base station controller from a distance. The LMT maintenance device is logically connected to the base station controller in these two types of configuration.

A managed object in the sense of the configuration management is a logical abstraction of a resource in the mobile communications network. In this connection, a distinction is made between hardware-related managed objects which describe a proprietary implementation of a function, and between function-related managed objects which are in each case the abstraction of a nonproprietary functionality.

Hardware-related managed objects can be configured via an LMT maintenance device which is operated in normal mode, i.e. in local mode and is connected to a base station or transcoder and rate adapter unit affected.

Within the scope of a configuration management, a number of operators of operating and maintenance devices of the operation and maintenance center, which are working independently of one another, and operators of LMT maintenance devices connected peripherally can simultaneously change the configuration of a mobile communications network in the form of configuration processes. A configuration process is usually initiated with a 'start configuration' command which is issued by an operation and maintenance device or an LMT maintenance device, and in the normal case, such a configuration process is concluded with an 'end configuration' command when all changes in configuration are entered. An initiated configuration process can also be aborted with an 'abort configuration' command when changes made to the configuration are discarded.

The operation and maintenance center regulates the control of operator accesses to the mobile communications network via the operation and maintenance center with the aid of security mechanisms which are implemented on the basis of so-called authentication and authorization checks, i.e. of user identification and allocation of corrections in central supervisory computers. Accordingly, control of user accesses via an operation and maintenance center is ensured. LMT accesses, i.e. configuration accesses via local maintenance devices which are connected to any network device of the base station subsystem provide an operator with the same configuration capabilities as accesses via the operation and maintenance center. For an access to the operation and maintenance system of a mobile communications network via such an LMT, an operator identification and an authorization check are frequently only carried out within this LMT. This has the result that an operator, who knows a local password for the LMT, can manipulate the entire mobile communications network.

From the international patent publication WO 96/30823, a radio communications system and a number of computer systems, in each case operating independently, are known which are connected to one another in a computer network. The autonomous computer system is connected to a central radio database via this computer network. Each computer system is exclusively responsible for operating a part of the radio communication system and stores configuration data in a local computer database as a map of the central radio database. During this process, the data must be continuously synchronized between the central computer database and the radio database. The European patent document EP 0 442 839 also discloses a number of independently operating computer systems which are connected to one another in a computer network. This document, therefore, does not deal with a communications network or an operation and maintenance system but with a computer network including a control of access to resources of this network. Whenever an access occurs, a resource manager requests the data required for authentication from a local reference monitor service. After having received this data, the resource manager checks whether corresponding rights of access to the resource exist. In the report "Sign and be safe" by Johnson J. T., Data Communications 24 (1995), January, No. 1, New York, pages 122 and 124, a network security program is disclosed which increases the security in computer networks and data processing systems by combining password and user authentication.

SUMMARY OF THE INVENTION

It is accordingly an object of the invention to provide an operation and maintenance system which overcomes the above-mentioned disadvantages of the heretofore-known systems of this general type and which allows a better control of operator accesses via peripherally connected maintenance devices.

With the foregoing and other objects in view there is provided, in accordance with the invention, an operation and maintenance system for a mobile communications network, including an operation and maintenance center having a maintenance device and a controller; a local maintenance terminal operatively connected to the operation and maintenance center; a base station subsystem connected to the local maintenance terminal and having network devices; the maintenance device being configured for centrally executing a network configuration, the local maintenance terminal being configured for peripherally executing a network configuration; the operation and maintenance center storing an LMT access table for an operator authorized to access the operation and maintenance system with the aid of the local maintenance terminal, the LMT access table including an operator record having a name entry, an operator password to be used by the operator for accessing the operation and maintenance center via the local maintenance terminal, and information on an extent of an access authorization of the operator; and the controller administering the LMT access table and initiating a nonvolatile storing of at least a part of the LMT access table in the network devices of the base station subsystem, the part of the LMT access table being required for accessing, with the aid of the local maintenance terminal, via the network devices.

In other words, an operation and maintenance system according to the invention contains an LMT access table which is stored in the operation and maintenance center and which contains for each operator authorized for access to the operation and maintenance system with the aid of an LMT maintenance device an operator record with a name entry, a specific operator password to be used by him for access via an LMT maintenance device, and information on the extent of the operator's access authorization. In addition, such an operation and maintenance system contains, in the operation and maintenance center, a controller for administering the LMT access table and for initiating a nonvolatile storing of in each case at least that part of the LMT access table in network devices of the base station subsystem which is required for an access with the aid of an LMT maintenance device via these network devices.

Such an operation and maintenance system ensures that the data relevant to LMT accesses are administered centrally in the operation and maintenance center for the entire mobile communications network. Nevertheless, in the case of an access via an LMT maintenance device, security-relevant data can be rapidly checked locally, namely in the network device via which an access is to be made, or in the base station controller responsible for this network device, since each network device contains for each authorized operator an operator record with a name entry, wherein the operator record allows a password control of the operator and contains information on the extent of the access authorization of this operator.

An advantageous embodiment of an operation and maintenance system according to the invention provides that the LMT access table administered and stored in the operation and maintenance center contains a number of table parts, namely a BSC table part with operator records for LMT accesses via base station controllers, a BTSE table part with operator records for LMT accesses via base stations and a TRAU table part with operator records for LMT accesses via transcoder and rate adapter units. Accordingly, the corresponding table parts contain for each operator an operator record depending on his access authorizations. In consequence, an operator who is authorized to access the mobile communications network both via base stations and via base station controllers and via transcoder and rate adapter units with the aid of an LMT maintenance device has a BSC table part record, a BTSE table part record and a TRAU table part record.

A division in the LMT access table in the operation and maintenance center makes it simpler to transfer to individual network devices in each case only the operator records needed for accesses via this network device and to store these records in these network devices. As a result, it is made possible, in an embodiment of the invention, for the controller of the operation and maintenance center to initiate the nonvolatile storing of the BSC table part of the LMT access table in base station controllers of the base station subsystem and also the nonvolatile storing of the BTSE part of the LMT access table in base stations and the nonvolatile storing of the TRAU table part of the LMT access table in transcoder and rate adapter units.

In accordance with another feature of the invention, the controller in the operation and maintenance center also initiates the nonvolatile storing of the BTSE table part and of the TRAU table part of the LMT access table in base station controllers of the base station subsystem.

If needed, storing of the TRAU table part and of the BTSE table part in a base station controller allows a local updating of the LMT access table part entry in a transcoder and data device or a base station, respectively, independently of the current availability of the operation and maintenance center. In addition, it is sufficient, according to a modification of the invention, if the controller of the operation and maintenance center initiates the nonvolatile storing of all table parts of the LMT access table in the base station controllers if the base station controllers then additionally initiate the storing of the specific table parts in the network devices connected to it.

An advantageous embodiment of an operation and maintenance system according to the invention provides for the operator password in each case being stored in encrypted form in the LMT access table. This makes it more difficult for an unauthorized person to spy out an operator password.

In accordance with a further modification of this aspect of an operation and maintenance system according to the invention, a network device, via which an access is possible with the aid of an LMT maintenance device, contains a controller for encrypting an operator password entered in unencrypted form by an operator, and for comparing the result of the encryption with the operator password stored in encrypted form in the LMT access table. This prevents an unencrypted operator password from having to be stored in the mobile communications network. In consequence, it could only be spied out directly while the operator password is being entered unencrypted in plain text.

In accordance with an added feature of an operation and maintenance system according to the invention a network device, via which an operator effects access in a configuring manner by entering his or her operator password, with the aid of an LMT maintenance device operated in a base station controller remote control mode, contains a controller in order to encrypt the operator password received unencrypted in plain text from the LMT maintenance device and to transfer it in encrypted form to the base station controller. This measure additionally makes it more difficult to spy out an operator password in this special application.

In accordance with an advantageous embodiment of an operation and maintenance system according to the invention, the controller in the operation and maintenance center is provided for generating encrypted operator passwords to be stored in the LMT access table by forming the hash function from a secret information item, from the operator password entered in plain text and from an identity information item containing the name of the operator.

Forming the hash function from a secret information item, which is for example unambiguous for a network element type, from an identity information item containing the name of the operator and from the operator password entered in plain text leads to an encrypted operator password, such that any applied analysis methods do not lead to the operator password to be entered in plain text. For example, the length can be 64 bits for the secret information item, up to 128 bits for the operator password and also up to 128 bits for the identity information item. When these data are used for calculating the hash function MD5 (T.I.S) and from this, the first 64 bits of the encrypted result are used as operator password for the LMT access table, then a reverse analysis is not possible.

If the secret information item used for forming the hash function is in each case network device type-specific, the same operator password also provides different, encrypted operator passwords to be stored for different table parts of the LMT access table.

If the operator password to be stored is encrypted in the manner explained above, it is recommended in accordance with an embodiment of the invention to configure the controllers of network devices such that the network device controllers encrypt an operator password entered in plain text by forming the hash function from a secret information item specific to the network device type, from the operator password entered in plain text and from an identity information item containing the name of the operator.

In order to be able to put a network device into operation when as yet no LMT access table or a part thereof has been stored in the network device, a storage device containing an installation password and containing information on the extent of the access authorization, which allows an operator to input a few configuration commands required for putting the network device into operation must be provided in each network device.

In this case, an operator does not log in with an identity specific to him or her and with his or her password when putting the network device into operation, but with the installation password and receives the access authorizations required for putting it into operation from the access control mechanism.

In accordance with another embodiment of the operation and maintenance system according to the invention, a controller is provided in the operation and maintenance center for administering a table of all base station controllers in which, since an initiation, caused by an update, of the nonvolatile storing of at least part of the LMT access table, a corresponding storage process has not been performed due to a disturbance or error, and for initiating this storing process if a cessation or disappearance of the disturbance has been recognized.

With each change of security-related data for LMT accesses such as, for example, changes by the security operator in the operation and maintenance center or password changes by the LMT operator himself, the LMT access tables affected by this change must be updated in all network device entities. This feature ensures that the LMT access tables of all base station controllers are updated. In addition, a table of all other network devices in which the LMT access table has not yet been updated could also be stored and administered in the operation and maintenance center. However, a particularly advantageous embodiment of the concept of the invention mentioned above provides in base station controllers in each case a controller for the respective administration of a table of all base stations and transcoder and rate adapter units allocated to it in which, since an initiation, necessary due to an update, of the nonvolatile storing of at least part of the LMT access table, a corresponding storage process has not been performed due to a disturbance, and for initiating this storage process if the disappearance of the disturbance has been recognized.

As a result, the availability of a connection to a network device, i.e. a base station or transcoder and rate adapter unit, or, respectively, the availability of the network device in the network only needs to be checked peripherally by the associated base station controller. In addition, it is sufficient if a communication connection is provided between base station controller and network device. It is not necessary to simultaneously provide a communication connection to the operation and maintenance center in this case.

Another advantageous embodiment of an operation and maintenance system according to the invention provides that at least the part of an LMT access table stored in a base station controller contains a special security operator record containing a specific security password, to be used by a security operator for access via an LMT maintenance device, and information on the extent of an access authorization in order to enable operator records of the LMT access table within a base station subsystem to be accessed even in the case of a network operation without an operation and maintenance center.

An operator password providing for an LMT access must always be unambiguous throughout the network. For this reason, a network device, via which an operator has changed his operator password with the aid of an LMT maintenance device, contains a controller for preventing access when using the changed operator password until the nonvolatile storing of the changed operator password in the LMT access table of the network device has taken place on initiation by the operation and maintenance center.

A particularly advantageous embodiment of an operation and maintenance system according to the invention provides for the information on the extent of the access authorization of each operator to be stored in the form of an authorization profile reference containing authorizations, defined individually by a security operator, of types of access to individual classes of managed objects.

In this configuration, the access authorizations can specify, for example, management areas such as configuration management or error management. In addition, the type of access, for example passive or active access, can be specifically defined. Such an authorization profile reference can be generated for example separately for each type of network device, with the aid of automatic tables containing a column for all classes of managed objects for which the current network device is administering a master database, i.e. for base station controllers, all classes of function-related managed objects within the base station subsystem and of hardware-related managed objects specific to the base station controller, for base stations, all classes of hardware-related managed objects specific to base stations, and for transcoder and rate adapter units, all cases of hardware-related managed objects relating to these units. In a command column of the automatic table of the authorized profile reference, all commands are listed which relate to the current class of managed objects. These two columns are generated automatically so that they are complete in each case. A further column which specifies the validity of the individual commands is empty in the normal state. In this column, the individual commands of the individual classes of managed objects can be in each case identified as authorized for access by a security operator as necessary.

An advantageous embodiment of an LMT access table of an operation and maintenance system according to the invention provides in each case a validity date or expiry date entry in each operator record fur operators, authorized for access to the operation and maintenance system with the aid of an LMT maintenance device, of the LMT access table stored in the operation and maintenance center.

This ensures that an access authorization expires mandatorily if this date entry has not been renewed by a security operator in the meantime.

An embodiment of the operation and maintenance system according to the invention provides in the operator record of operators, authorized for access to the operation and maintenance system with the aid of an LMT maintenance device, of the LMT access table stored in the operation and maintenance center, in each case an information item on whether the operator is allowed to change his or her operator password with the aid of an LMT maintenance device connected to a network device of a base station subsystem of the mobile communications network.

Such an entry is appropriate, for example, if it is intended to use one password for a number of operators. In this case, it should not be possible for an individual operator to change the password. A change should then only be performed by the security operator in the operation and maintenance center.

An embodiment of an operation and maintenance system according to the invention provides in the operator record of the operators, authorized for access to the operation and maintenance system with the aid of an LMT maintenance device, of the LMT access table stored in the operation and maintenance center, in each case an information item on the types of network devices for which the operator has access authorization.

A special modification of this aspect of the invention also provides for the operator record of operators authorized for access to the operation and maintenance system with the aid of an LMT maintenance device to contain in each case an information item on the physical devices of the types of network devices for which the operator in each case has access authorization.

This makes it possible to grant certain operators access to quite specific network devices but to prevent access to other network devices of the same type.

Other features which are considered as characteristic for the invention are set forth in the appended claims.

Although the invention is illustrated and described herein as embodied in an operation and maintenance system for a mobile communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
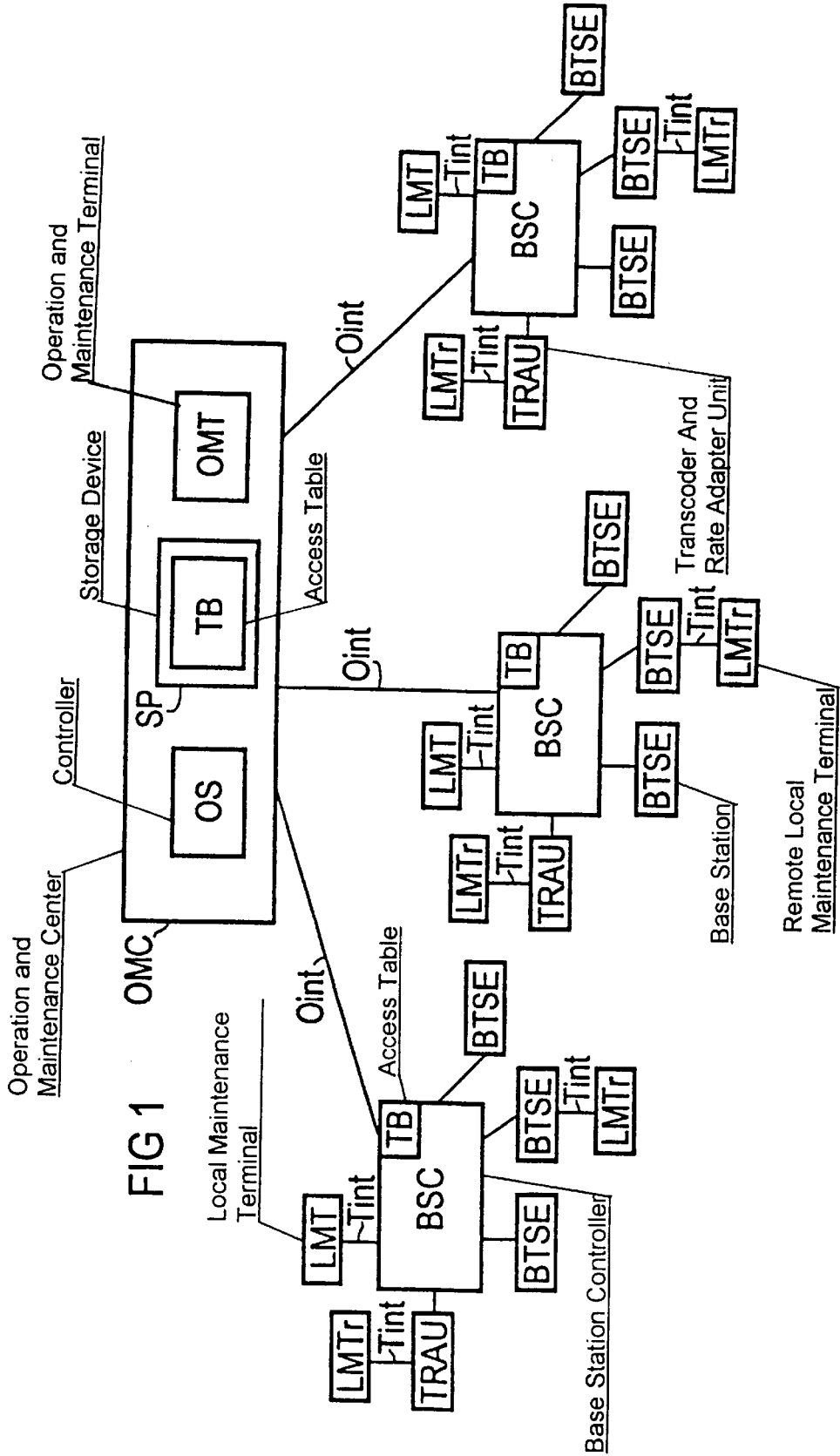
FIG. 1 is a schematic block diagram of a part of a mobile communications network relevant to the invention.

Referring now to the figures of the drawings in detail and first, particularly, to FIG. 1 thereof, there is shown, as part of a base station subsystem, three base station controllers BSC, in each case including three radio base stations BTSE and one transcoder and rate adapter unit TRAU. In the area of each of the base station controllers BSC shown, an exemplary maintenance device LMT is shown which is connected to the base station controller BSC via an interface Tint. In addition, a maintenance device LMTr is shown in each case, which is coupled to the transcoder and rate adapter unit TRAU via an interface Tint, and a maintenance device LMTr which is connected to one of the radio base stations BTSE of each base station controller BSC via an interface Tint. In contrast to the reference symbol LMT, the reference symbol LMTr is intended to indicate that the corresponding maintenance device accesses the base station controller BSC in remote control mode, also called remote mode.

The three base station controllers BSC shown in FIG. 1 are in each case coupled via an interface Oint to an operation and maintenance center OMC which contains an operation and maintenance device OMT, a controller OS according to the invention and a storage device SP containing an LMT access table TB.

As is shown in the base station controller BSC of FIG. 1, each of these base station controllers contains the LMT access table TB. The BTSE table part of the LMT access table TB contained in each base station BTSE and the TRAU table part of the LMT access table contained in each transcoder and rate adapter unit TRAU are not shown in FIG. 1 in order to keep FIG. 1 simple. These table parts and, respectively, the LMT access table, are of course stored in a nonvolatile manner in the individual network elements, for example in a disk storage unit or in a programmable electronic nonvolatile memory.

The LMT access table TB contained in the operation and maintenance system shown in FIG. 1 is generated in the operation and maintenance center OMC via a maintenance device OMT by a security operator, for example a system administer or an operator responsible for the global security of the operation and maintenance system, who generates an operator record for each authorized LMT operator or, respectively, for each group of LMT operators. In the exemplary embodiment, this operator record contains an identity information item of the user which contains a user name which may be specified generically. In addition, it contains an operator password which is encrypted in the operation and maintenance center OMC in accordance with a method which will be explained later and is then stored in the operator record. In addition, the operator record contains an expiry date, i.e. the date after which an access by the LMT operator is no longer valid. In addition, it contains a "user-changeable" information item which specifies whether the operator password may be changed by the LMT operator himself or herself or only at the operation and maintenance center OMC. In addition, the operator record contains information on types of network devices which defines the type of network device or, respectively, the types of network devices for which an LMT operator access is allowed. Possible values of this are BSC in local mode or in remote mode, BTSE in local mode and TRAU in local mode. In addition, the operator record contains network device information which specifies the physical network devices of the previously authorized network device types for which an LMT operator access is allowed. Possible values of these are "all" for all entities of the managed objects in accordance with the authorized network device types or "set of values" which specifies individual network device entities of certain network device types within a base station subsystem area. In this configuration, various access areas can be defined, especially in the BSC remote mode. In addition, each operator record contains an authorization profile reference which contains a pointer to an authorization profile specific to the corresponding LMT operator or, respectively, the group of LMT operators.

The security operator allocates, at the operation and maintenance center OMC, a specific set of authorizations, called authorization profile reference, to each LMT operator. These authorizations specify, on the one hand, the management areas which are allowed to be administered by the corresponding LMT operator. Examples of this are configuration management or error management. In addition, these authorizations specify the type of access, for example whether a passive access such as GET or an active access such as SET, DELETE or CREATE are authorized. In the exemplary embodiment, an authorization profile reference is here defined separately for each network device type with the aid of automatic tables having three columns (or rows) which are all specified automatically and only one of which can be influenced by the security operator. One column (or row) lists all classes of managed objects for which a corresponding network device type contains a master database, i.e. part of the LMT access table. These are all classes of function-related managed objects within the base station subsystem and of the base station controller-specific hardware-related managed objects for base station controllers BSC, all classes of hardware-related managed objects which are specific to base stations for base stations BTSE and all classes of hardware-related managed objects related to a transcoder and rate adapter unit TRAU for transcoder and rate adapter units TRAU. A further column (or row, respectively) contains a list of all commands which relate to the respective class of managed objects specified in the aforementioned column or row, respectively. The third column (or row, respectively) contains information on the validity of the authorization. This column (or row, respectively) is the only column (or row, respectively) which can be changed by a security operator. The values automatically set in this column are "invalid" ("blank"). The security operator can enter the authorizations assigned to an LMT operator as "valid" in this column (or row, respectively). Once the last-mentioned column has been updated, the table is stored as authorization profile reference in the operation and maintenance center OMC and used in the aforementioned definition of an operator record.

In the exemplary embodiment described, the following security-related activities take place in the operation and maintenance center:

the generation of authorization profiles;

the generation of operator records with the encrypted operator password;

the formation and storing of at least one LMT access table containing a BSC table part for accesses to base station controllers BSC, a BTSE table part for accesses to base stations BTSE and a TRAU table part containing records for LMT accesses to transcoder and rate adapter units; and the transmission of the LMT access table, i.e. of the BSC table part, the BTSE table part and the TRAU table part, to all base station controllers BSC.

In the base station controllers BSC all LMT access table parts are stored on a hard disk, the BTSE part is transferred to all base stations BTSE and the TRAU table part is transferred to all transcoder and rate adapter units TRAU.

In each base station BTSE, the BTSE table part of the LMT access table is stored in a nonvolatile storage area.

In each transcoder and rate adapter unit TRAU, the TRAU table part of the LMT access table is stored in a nonvolatile storage area.

In the operation and maintenance center OMC, the encrypted LMT operator password is generated by using a secret information item, which is unambiguous for each network device type, of 64 bits in length, using the operator password of up to 128 bits in length entered in plain text and using an identity information item of up to 128 bits in length which contains the name of the operator. This data is used for calculating the hash function MD5 (T.I.S). The first 64 bits of the encrypted result are used as the operator password in the operator record. All operator records for a network device type, which are generated in the operation and maintenance center, form a table part of the LMT access table, i.e. the BSC table part, the BTSE table part or the TRAU table part. The BSC table part applies to LMT accesses to base station controllers BSC both in local mode and in remote mode of the LMT maintenance device LMT, LMTr. To ensure that the mobile communications network still remains functional even with a failure of the operation and maintenance system OMC or of the interface Oint to the operation and maintenance center OMC, the BTSE table part and the TRAU table part are also stored in the base station controllers BSC.

In order to access the operation and maintenance system of the mobile communications network via an LMT maintenance device, an operator has logged on at the operation and maintenance system via the LMT maintenance device LMT, LMTr. In the text which follows, the corresponding process is called LMT log-in and the operator enters the following log-in parameters: a user identifier such as, for example, his or her name, his or her user password and information on the operating mode of the LMT maintenance device LMT, LMTr. The LMT operating mode can be either local mode or remote mode.

In the text which follows, the security management in an operation and maintenance system according to the exemplary embodiment is explained for the case of an LMT access when the LMT maintenance device is in local mode. In this case, the LMT maintenance device LMT, LMTr can be operated at three different network devices, namely a base station controller BSC, a base station BTSE or a transcoder and rate adapter unit TRAU. If, therefore, the term network device is used in conjunction with the security management procedure described for an access of an LMT maintenance device in local mode, this is either a base station controller BSC, a base station BTSE or a transcoder and rate adapter unit TRAU.

In a first step, the operator enters the log-in parameters, entering "local mode" as operating mode of the LMT maintenance device LMT, LMTr. The other parameters are "UserID", which is the user identity -information item (name) and "password", which is the user password.

In a next step, a controller in the LMT maintenance device LMT, LMTr generates a message containing these parameters UserID, password, local mode and sends them to the local network device to which the LMT maintenance device LMT, LMTr is connected. Using the parameter UserID, the network device looks for the corresponding operator record in the table part of the LMC access table TB responsible for the network device.

The controller of the network device then investigates whether the entry "expiry date" of the operator record is later than the current date. If this is so and the operator record is still valid, the controller of the network device calculates the hash function MD5 (T.I.S) using secret information which is hidden within the software of the controller of the network device, the password which has been entered in plain text by the operator at the LMT maintenance device LMT, LMTr, and the UserID which has been entered by the operator. The first 64 bits of the authorized hash function are compared with the operator password contained in the operator record of the LMT access table part. If they match, the network device sends a log-in confirmation to the LMT maintenance device LMT, LMTr. If, in an embodiment of the exemplary embodiment, the expiry date information does not relate the access by the operator in general but only to the access using a previous, existing operator password and the operator record contains an entry which authorizes the operator to change his operator password himself or herself, the old, expired password is encrypted by the network device and temporarily stored as an old password. Following this, the controller of the network device requests the operator at the LMT maintenance device LMT, LMTr to change his or her password.

If the comparison of an operator password encrypted in a network device with the operator password contained in encrypted form in the operator record does not provide a match, the log-in attempt is rejected and the interface Tint of the network device to the LMT maintenance device LMTr, LMT remains blocked.

Independently of whether the log-in attempt is successful or not, the network device generates a security alarm message, for example according to ISO/IEC 10164-7 or, respectively, ITU-T Rec. X.736, which is transferred to the operation and maintenance center OMC via the interface Oint. This message is temporarily stored in the network device and remains in the buffer store until a communication with the operation and maintenance center OMC has been correctly dealt with or, respectively, a confirmation has been received from the operation and maintenance center OMC.

During the initial installation of a network device, i.e. the on-site installation of a network device with the aid of an LMT maintenance device, no operator records are present in the network device. In this case, therefore, the operator logs in with the aid of a default password which is permanently stored, for example in an EPROM of the network device, and is known to the LMT maintenance installation operator. A minimum authorization profile reference allocated to this default password only allows the operator to enter configuration commands via the LMT maintenance device LMT, LMTr, which are required for putting the network device into operation.

Figure 2:
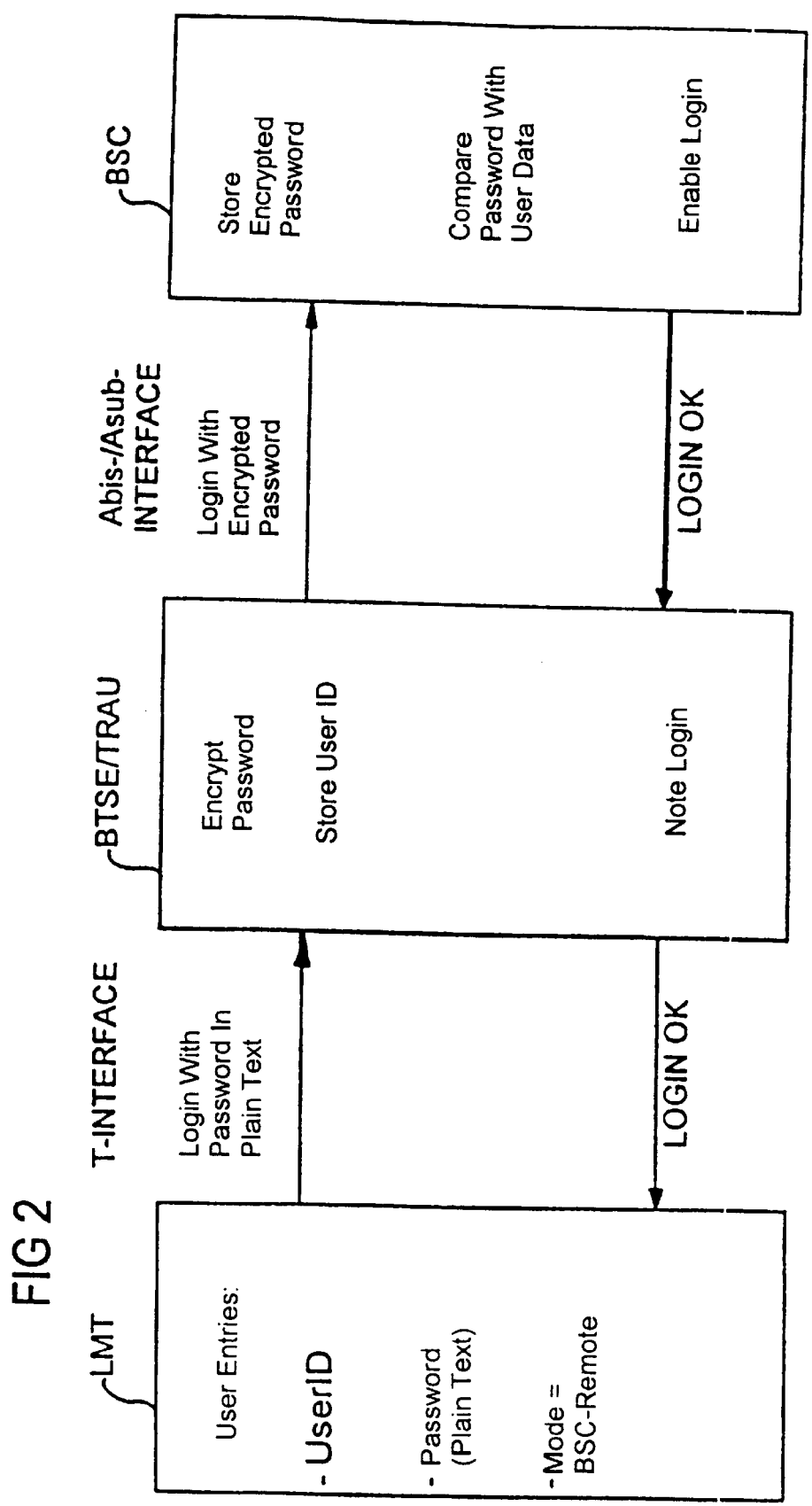
FIG. 2 is a block diagram of individual network elements illustrating an LMT access log-on process.

Referring to FIG. 2, the log-in of an operator with the aid of an LMT maintenance device at a base station BTSE or a transcoder and rate adapter unit TRAU in BSC remote mode for accessing a base station controller BSC is described in the text which follows. For this purpose, the operator enters his or her identifier "UserID", his or her operator password "password" and the LMT operating mode "BSC remote mode" at the LMT maintenance device LMTr, which is connected either to a base station BTSE or to a transcoder and rate adapter unit TRAU. A controller in the LMT maintenance device LMTr uses these parameters to generate a message and sends this message to the local network device, i.e. a base station BTSE or a transcoder and rate adapter unit TRAU. This message contains the operator password in plain text. To prevent this password from being transmitted in unencrypted form by relatively long Abis or Asub links, respectively, a controller in the local network device BTSE or TRAU forms the hash function MD5 (T.I.S) with the aid of a secret information item contained in the software of the network device but valid for the base station controller network device type, the password and the identity information item UserID. In addition, the identity information item UserID is stored in the network device BTSE or, respectively, TRAU. Following this, the local network device forwards a log-in message containing the UserID and the encrypted password to the base station controller BSC.

In the base station controller BSC, the password validity and the identification of the user are checked by using the same algorithm as in the log-in process in local mode described above. Following this, the base station controller BSC sends a positive or negative acknowledgment message to the network device BTSE or TRAU via which the log-in process is running. The network device BTSE or TRAU takes note of this acknowledgment message and transfers it to the LMT maintenance device. The figure shows the transmission of a positive acknowledgment message log-in OK.

In addition, the base station controller BSC generates, as already described above for the log-in process in local mode, a security alarm message which is transferred to the operation and maintenance center OMC where it is stored. The last-mentioned stop is not shown in FIG. 2 since FIG. 2 is restricted to the relationships between the LMT maintenance device LMTr, a network device and the base station control BSC.

There are several possibilities for preventing the access of an operator to the operation and maintenance system of the mobile communications network via an LMT maintenance device LMT, LMTr. One possibility is for the security operator at the operation and maintenance center OMC to set the parameter "expiry date" in the operator record allocated to this operator to a date which has already expired. In this case, the security operator must additionally ensure that the LMT operator, the operator accesses of which are to be prevented in future, is not authorized to change the password. If a corresponding authorization is entered in the operator record, the security operator must also, in consequence, change such an entry to lack of authorization. This method is particularly suitable for temporarily blocking operator accesses since the remaining data of the operator record are retained.

However, the security operator can also delete the entire operator record in the LMT access table. This blocks an operator or a group of operators, respectively, once and for all.

If a common password is used by a number of operators of a group of operators and there is a risk that this password has become known to an unauthorized person, the security operator can prevent any future access through the use of this password by changing the operator password in the corresponding operator record.

Independently of the manner in which the access of an operator is to be prevented, the current LMT access table must be transferred to every entity of the current network device types after entries have been changed by the security operator in the operation and maintenance center OMC. The operation and maintenance center OMC generates a security alarm message analogously to the security alarm messages already described in conjunction with the log-in processes.

If an operator is authorized to change his or her password independently, he or she can do so with the aid of an LMT maintenance device LMT, LMTr which accesses a base station controller BSC.

In the text which follows, the process by which an LMT operator changes his or her own password is described with reference to FIGS. 3 and 4.

In each network device, there is an entity or instance of a managed object "LMTaccess" having the attribute "LMT-password" which is used for generating a message AttributeValueChangedNotification. This message AttributeValueChangeNotification (for example according to ISU/IEC 10164-1 or, respectively, ITU-T Rec. X.730), which is designated by AVCN in FIGS. 3 and 4, is sent to the operation and maintenance center OMC in a mode expecting an acknowledgment.

After a successful log-in process, an LMT operator can enter his or her own new password for the current LMT operating mode with the command "Change Password". Such a change of his or her own password is implicitly possible for the LMT operator if his or her old password has become invalid and the user record of the LMT access table TB contains an entry that the user is authorized to change the password.

After the "Change Password" command has been entered at an LMT maintenance device LMT, LMTr, the controller of this LMT maintenance device LMT, LMTr generates a message "SET" containing the new password and sends it first to the local network device, for example a base station controller BSC, a base station BTSE or a transcoder and rate adapter unit TRAU. This "SET" message is thus transferred via the T interface. The further progress of the password-changing process depends, among other things, on the operating mode of the LMT maintenance device LMT, LMTr. In the text which follows, the sequence is therefore first described for the case where the LMT maintenance device LMTr accesses a base station controller BSC in BSC remote mode via a base station BTSE or a transcoder and rate adapter unit TRAU. This sequence is shown in FIG. 3. Following this, the differences in the password-changing sequence are shown for the case where the LMT maintenance device LMT is connected to a base station controller BSC in local mode via the T interface.

Figure 3:
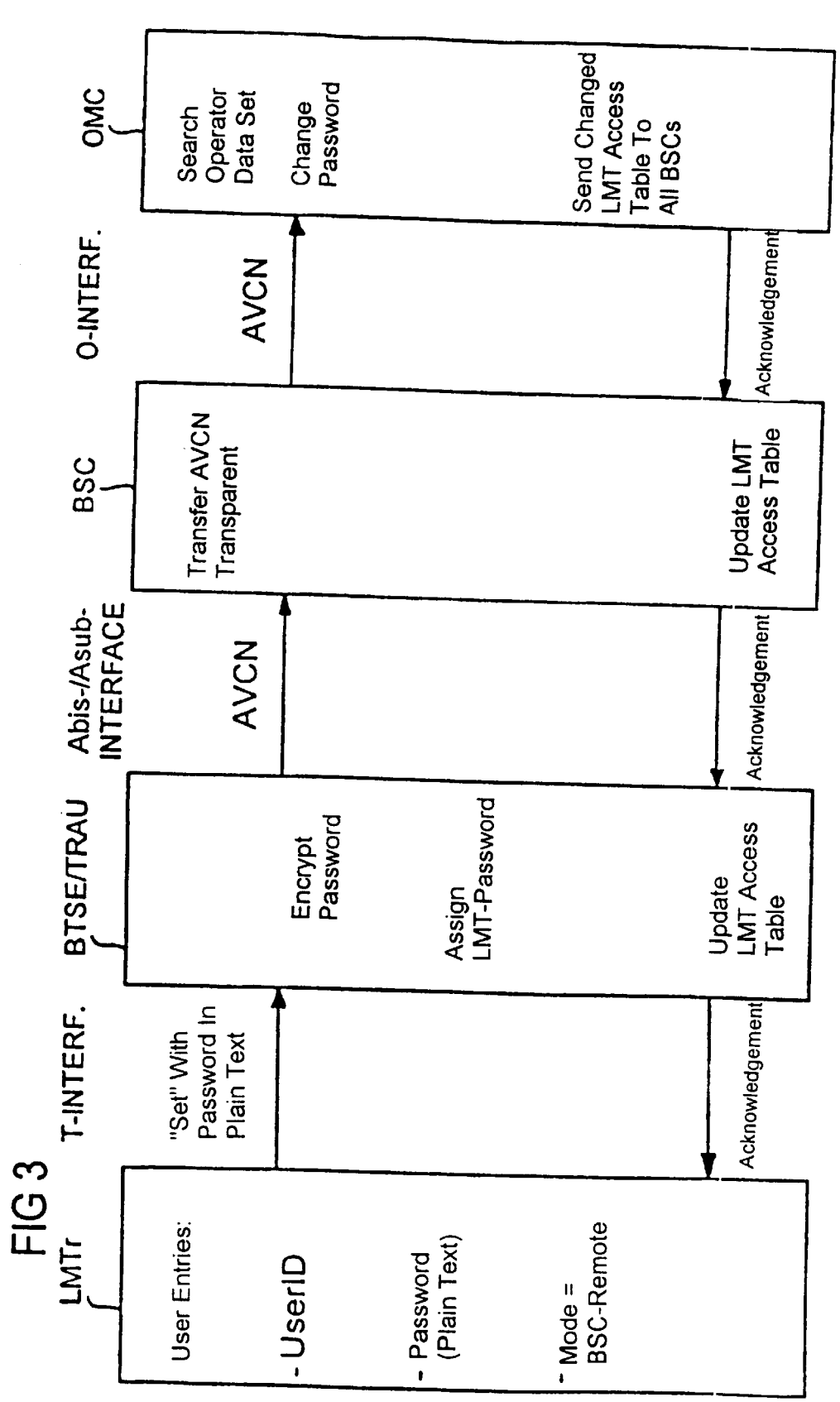
FIGS. 3 and 4 are block diagrams of individual network elements illustrating the process of changing an operator password by the operator of an LMT maintenance device, which is operated in BSC remote control mode, and, respectively, directly at a base station controller.

In the case according to FIG. 3, the operator enters his or her identifier UserID, his or her password in plain text and the BSC remote mode as mode, in addition to the "Change Password" command (not shown). As already mentioned, the controller of the LMT maintenance device LMTr then transfers a SET message with the password, which is provided in plain text, via the T interface to the network device BTSE/TRAU via which the base station controller BSC has been accessed in BSC remote mode. In the network device BTSE/TRAU, the controller of the network device BTSE/TRAU calculates the hash function with the aid of a secret information item contained in the software of the network device BTSE/TRAU, the new password and the operator name UserID, which was stored during the log-in process. The first 64 bits of the result are transferred as the new encrypted password to the base station controller BSC where they are assigned to the attribute "LMTpassword" where the password can be changed by the user and is still valid. The entity of a managed object LMTaccess generates an AttributeValueChangedNotification AVCN which is transferred via the Abis/Asub interface to the base station controller BSC and from there transparently via the O interface to the operation and maintenance system OMC. Using the value "Old Attribute Value", which corresponds to the old encrypted password and was stored during the log-in process, the controller within the operation and maintenance center OMC finds the current operator record in the LMT access table and replaces the value "password" by the new value "LMTpassword". The operation and maintenance center OMC then initiates the transmission of the changed LMT access table to all base station controllers BSC. A corresponding command is transferred to the base station controller BSC via the O interface. In the base station controller BSC, the LMT access table is updated. In addition, the command is transferred via the Abis/Asub interface to the network device BTSE/TRAU in which the LMT access table is also updated. The network device BTSE/TRAU transfers an acknowledgment message to the LMT maintenance device LMTr via the T interface. The new password is only valid if the acknowledgment message of the operation and maintenance center OMC can be transferred right to the LMT maintenance device LMTr. This ensures that the new password is updated in the entire mobile communications network from the operation and maintenance center OMC.

Since the LMT maintenance device LMTr is operated in BSC remote mode in the exemplary embodiment according to FIG. 3, the network device BTSE/TRAU, which can be a base station BTSE or a transcoder and rate adapter device TRAU, must use a secret information item, which is allocated to the base station controller BSC type of network device, for encrypting the password.

Figure 4:
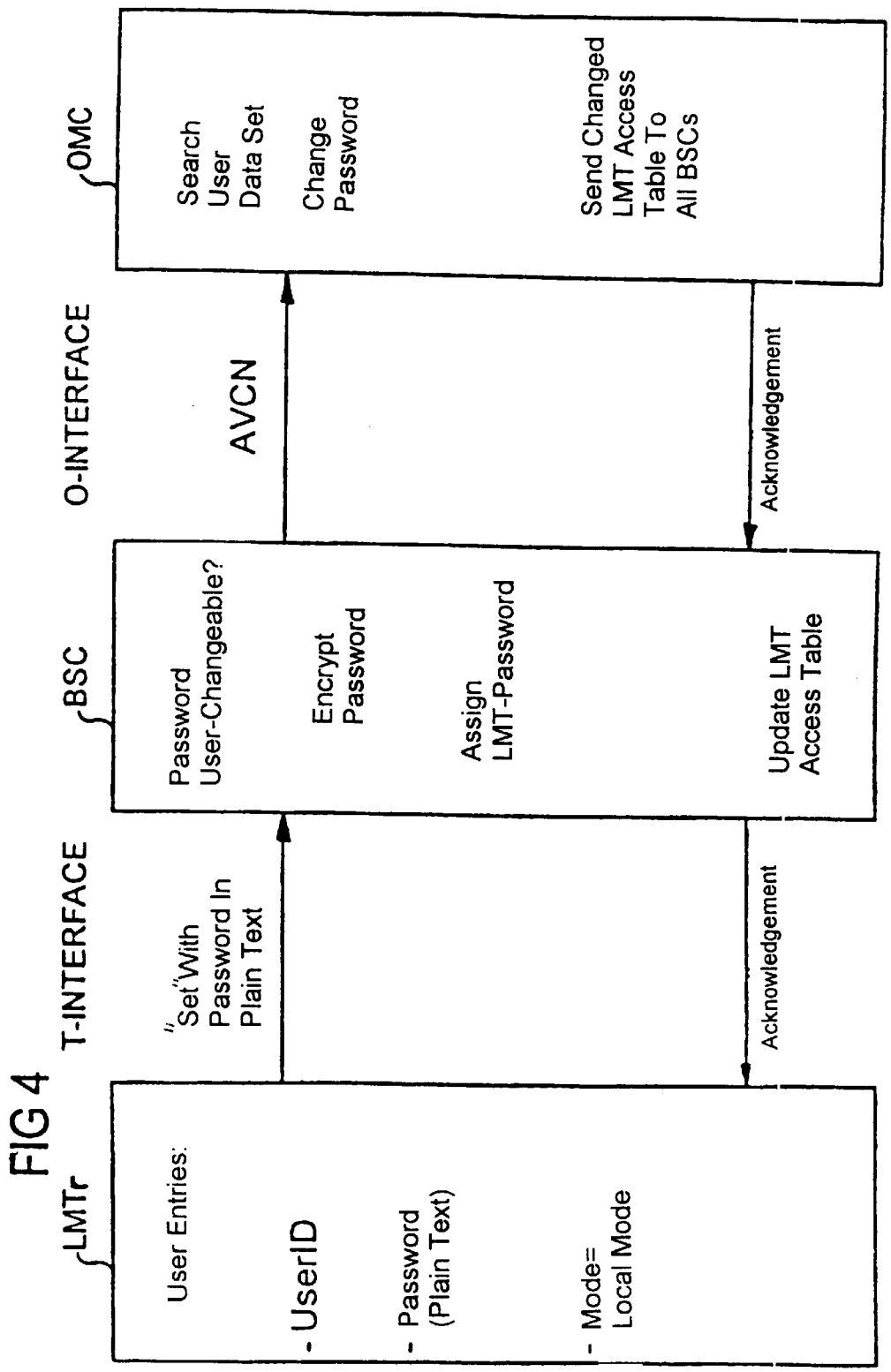

In the text which follows, the same sequence is described for the case where the LMT maintenance device LMT is connected to a base station controller BSC in local mode, referring to FIG. 4. In this case, only the differences from the sequence described above with reference to FIG. 3 will be discussed.

As the operator inputs, in addition to the UserID and the password entered in plain text, the local mode is entered as mode information. Following this, the SET message, containing the password in plain text, is transferred directly to the base station controller BSC via the T interface. In the base station controller BSC, largely the same sequences are executed as have been described above in conjunction with the network device BTSE/TRAU, referring to FIG. 3. The AttributeValueChangedNotification AVCN output by the base station controller BSC is here transferred directly to the operation and maintenance center OMC via the O interface. The remaining sequence is identical to that of the example described above.

In the example according to FIG. 3 and in the example according to FIG. 4, a security alarm report is generated and stored in the operation and maintenance center OMC.

In the exemplary embodiment, the described entity of a managed object "LMTaccess" having the attribute "LMTpassword" exists as an entity of a hardware-related managed object in each base station BTSE and each transcoder and rate adapter unit TRAU and as an entity of a function-related managed object in each base station controller BSC. Due to its very restricted function, it is also called a "Dummy" entity.

With each change of security-related data for LMT accesses, i.e., for example, with changes by the security operator at the operation and maintenance center OMC or with password changes by the LMT operator himself, the corresponding LMT access tables must be updated centrally from the operation and maintenance center OMC in all network element entities. For this purpose, the operation and maintenance center OMC administers a table containing all base station controllers BSC which do not have the current state of the LMT access table. This can be due to, for example, a failure of the O interface, an internal fault within a base station controller BSC etc. The changed LMT access table is then sent automatically to these base station controllers BSC as soon as communication has been restored in each case between the operation and maintenance center OMC and the base station controller BSC.

In addition, each base station controller BSC in each case administers a table of all base stations BTSE and all transcoder and rate adapter units TRAU which do not have the current state of the BTSE table part or, respectively, the TRAU table part of the LMT access table TB. The current LMT access table TB or, respectively, the BTSE table part or the TRAU table part is automatically transferred to these BTSE entities of base stations or, respectively, TRAU entities of transcoder and rate adapter units as soon as communication has been restored via the Abis or, respectively, Asub interface.

In the exemplary embodiment of an operation and maintenance system described, an emergency mode is additionally provided. In this emergency mode it is possible to process or change security-related data in a restricted manner for LMT accesses to a base station subsystem area even when the network is operated without an operation and maintenance center OMC. These changes can then be carried out by the security operator via an LMT maintenance device LMT which is connected to a base station controller BSC.

For this purpose, the part of the LMT access table TB stored in the base station controller BSC contains an operator record specific to the security operator. After the security operator has logged in with a password contained in this special operator record, he or she can access all table parts of the LMT access table TB stored in the base station controller BSC and change individual operator records. After that, changed LMT access tables TB or, respectively, BTSE table parts and TRAU table parts are sent to all connected base stations BTSE and transcoder and rate adapter units TRAU where they are stored in an updated version. The security operator must also enter the changed LMT access table TB in the operation and maintenance center OMC so that an automatic updating can take place in the entire mobile communications network as soon as the operation and maintenance center OMC is operational again.

I claim:

1. An operation and maintenance system for a mobile communications network, comprising:

an operation and maintenance center having a maintenance device and a controller;

a local maintenance terminal operatively connected to said operation and maintenance center;

a base station subsystem connected to said local maintenance terminal and having network devices;

said maintenance device being configured for centrally executing a network configuration, said local maintenance terminal being configured for peripherally executing a network configuration;

said operation and maintenance center storing an LMT access table for an operator authorized to access the operation and maintenance system with the aid of said local maintenance terminal, said LMT access table including an operator record having a name entry, an operator password to be used by the operator for accessing said operation and maintenance center via said local maintenance terminal, and information on an extent of an access authorization of the operator; and said controller administering said LMT access table and initiating a nonvolatile storing of at least a part of said LMT access table in said network devices of said base station subsystem, the part of said LMT access table being required for accessing, with the aid of said local maintenance terminal, via said network devices.

2. The operation and maintenance system according to claim 1, wherein said network devices include a base station controller, a base station, and a transcoder and rate adapter unit, and said LMT access table stored in said operation and maintenance center contains a BSC table part with first operator records for a local maintenance terminal access via said base station controller, a BTSE table part with second operator records for a local maintenance terminal access via said base station, and a TRAU table part with third operator records for a local maintenance terminal access via said transcoder and rate adapter unit.

3. The operation and maintenance system according to claim 2, wherein said controller of said operation and maintenance center initiates a nonvolatile storing of said BSC table part of said LMT access table in said base station controller of said base station subsystem, a nonvolatile storing of said BTSE table part of said LMT access table in said base station and a nonvolatile storing of said TRAU table part of said LMT access table in said transcoder and rate adapter unit.

4. The operation and maintenance system according to claim 3, wherein said controller of said operation and maintenance center also initiates a nonvolatile storing of said BTSE table part and said TRAU table part of said LMT access table in said base station controller of said base station subsystem.

5. The operation and maintenance system according to claim 1, wherein said LMT access table stores said operator password in encrypted form.

6. The operation and maintenance system according to claim 5, wherein one of said network devices enables an access to said operation and maintenance center with the aid of said local maintenance terminal, said one of said network devices includes a network device controller for encrypting a password entered in unencrypted form by the operator, and for comparing an encryption result with said operator password stored in encrypted form in said LMT access table.

7. The operation and maintenance system according to claim 6, wherein said network device controller of said one of said network devices encrypts the password, entered by the operator in unencrypted form, by forming a hash function from a network-device-type-specific secret information item, from the password and from an identity information item containing an operator name.

8. The operation and maintenance system according to claim 1, wherein said controller of said operation and maintenance center generates an encrypted operator password to be stored in said LMT access table by forming a hash function from a secret information item, from said operator password entered in unencrypted form and from an identity information item containing an operator name.

9. The operation and maintenance system according to claim 1, wherein said LMT access table has network-device-type-specific table parts, and wherein said controller of said operation and maintenance center generates an encrypted operator password to be stored in said network-device-type-specific table parts of said LMT access table by forming a hash function from a secret information item specific to a respective network device type, from said operator password entered in unencrypted form and from an identity information item containing an operator name.

10. The operation and maintenance system according to claim 9, wherein said network-device-type-specific table parts include a BSC table part, a BTSE table part and a TRAU table part.

11. The operation and maintenance system according to claim 1, wherein each of said network devices includes a storage device storing an installation password and information on the extent of the access authorization allowing the operator to input configuration commands required for putting one of said network devices into operation.

12. The operation and maintenance system according to claim 1, wherein said network devices include base station controllers, wherein said controller of said operation and maintenance center, due to a disturbance, has not performed an update-initiated nonvolatile storing of at least the part of said LMT access table in given ones of said base station controllers, wherein said controller of said operation and maintenance center administers a table for said given ones of said base station controllers, and wherein said controller initiates the nonvolatile storing after recognizing a disappearance of the disturbance.

13. The operation and maintenance system according to claim 1, wherein said network devices include a base station controller having a control device, transcoder and rate adapter units, and base stations assigned to said base station controller, wherein, due to a disturbance, an update-initiated nonvolatile storing of at least the part of said LMT access table has not been performed in given ones of said base stations and transcoder and rate adapter units, wherein said control device of said base station controller administers a table for at least said given ones of said base stations and transcoder and rate adapter units, and wherein said control device of said base station controller initiates the nonvolatile storing after recognizing a disappearance of the disturbance.

14. The operation and maintenance system according to claim 1, wherein said network devices include a base station controller storing the part of said LMT access table, the part of said LMT access table including a special security operator record containing a specific security password to be used by a security operator for access via said local maintenance terminal, and containing information on the extent of the access authorization for enabling an access to said operator record of said LMT access table within said base station subsystem in case of a network operation without said operation and maintenance center.

15. The operation and maintenance system according to claim 1, wherein, after the operator has changed said operator password with the aid of said local maintenance terminal and via one of said network devices, said one of said network devices is configured to prevent access with a changed operator password until said controller of said operation and maintenance center initiates the nonvolatile storing of said changed operator password in said LMT access table in said one of said network devices.

16. The operation and maintenance system according to claim 1, wherein said network devices include a base station controller, wherein one of said network devices is used for a configuring access via said local maintenance terminal by the operator inputting said operator password, wherein said local maintenance terminal operates in a base station controller remote mode, and wherein said one of said network devices encrypts said operator password received in unencrypted form from said local maintenance terminal and transfers said operator password in encrypted form to said base station controller.

17. The operation and maintenance system according to claim 1, wherein said operation and maintenance center stores authorization profile references for a plurality of operators, said authorization profile references include information on an extent of an access authorization for each of the plurality of operators and include, defined individually by a security operator, authorizations for types of accesses to individual classes of managed objects.

18. The operation and maintenance system according to claim 1, wherein said operator record to be used by the operator for accessing said operation and maintenance center via said local maintenance terminal contains a validity data information item.

19. The operation and maintenance system according to claim 1, wherein said operator record to be used by the operator for accessing said operation and maintenance center via said local maintenance terminal contains an information item on whether the operator is allowed to change said operator password with the aid of said local maintenance terminal connected to one of said network devices of said base station subsystem.

20. The operation and maintenance system according to claim 1, wherein said network devices include given types of network devices and wherein said operator record to be used by the operator for accessing said operation and maintenance center via said local maintenance terminal contains information on access authorizations for said given types of said network devices accessible for the operator.

21. The operation and maintenance system according to claim 20, wherein said given types of network devices include physical devices and wherein said operator record to be used by the operator for accessing said operation and maintenance center via said local maintenance terminal contains information on access authorizations for said physical devices of said given types of network devices accessible for the operator.

22. The operation and maintenance system according to claim 1, wherein said local maintenance terminal is connected to one of said a network devices of said base station subsystem.

* * * * *